United States Patent [19]

Nahas

[11] 3,880,987
[45] Apr. 29, 1975

[54] HYDROGEN MANUFACTURING PROCESS
[75] Inventor: Nicholas C. Nahas, Baytown, Tex.
[73] Assignee: Exxon Research and Engineering Company, Houston, Tex.
[22] Filed: June 1, 1973
[21] Appl. No.: 365,905

[52] U.S. Cl. ............ 423/657; 423/648; 423/89; 423/618
[51] Int. Cl. ............ C01b 1/02; C01b 1/07
[58] Field of Search ........... 423/648, 657, 658, 650, 423/89, 618

[56] References Cited
UNITED STATES PATENTS

| | | |
|---|---|---|
| 2,182,747 | 12/1939 | Marshall, Jr. ........................ 423/658 |
| 2,449,635 | 9/1948 | Barr .................................... 423/658 |
| 2,635,947 | 4/1953 | Reed et al. .......................... 423/658 |
| 3,017,250 | 1/1962 | Watkins ............................... 423/657 |
| 3,442,619 | 5/1969 | Huebler .............................. 423/658 |
| 3,619,142 | 11/1971 | Johnson et al. ..................... 423/658 |
| 3,761,352 | 9/1973 | Souriau ............................ 423/657 X |
| 3,821,362 | 6/1974 | Spacil .............................. 423/618 X |

Primary Examiner—Edward Stern
Attorney, Agent, or Firm—J. E. Reed

[57] ABSTRACT

Hydrogen is produced by reacting a reducing gas with stannic oxide at a temperature of from about 800° to 1,200° F. until from about 30 to about 50% by weight of the stannic oxide has been converted to metallic tin, contacting the resulting mixture of stannic oxide and metallic tin with steam at a temperature of from about 800° to 1,200°F., and recovering substantially pure hydrogen.

19 Claims, 5 Drawing Figures

HYDROGEN MANUFACTURING PROCESS

BACKGROUND OF THE INVENTION

1. Field of the Invention

This invention relates to the manufacture of industrial hydrogen and is particularly concerned with an improved process for generating essentially pure hydrogen.

2. Description of the Prior Art

Processes for the large scale manufacture of industrial hydrogen are generally based upon the reaction of steam with hydrocarbons to produce a synthesis gas containing hydrogen, carbon monoxide, and small amounts of carbon dioxide; subsequent treatment of the carbon monoxide with steam in the presence of a catalyst to produce additional carbon dioxide and hydrogen by the water-gas shift reaction; and separation, purification and compression of the product hydrogen. Such processes are effective when used with natural gas and similar hydrogen-rich starting materials but become less attractive when coal char, coke or other starting materials of lower hydrogen content are used. The lower hydrogen-to-carbon monoxide ratios obtained by gasification of solid or heavy liquid hydrocarbons and equilibrium limitations which affect the water-gas shift reaction at the higher temperatures required for gasification make hydrogen production from such starting materials considerably more expensive than if natural gas or a similar hydrogen-rich material is used.

Processes for the production of hydrogen by the reaction of carbon monoxide with a metallic oxide to produce carbon dioxide and the corresponding metal or a reduced metal oxide and the use of this metal or reduced metal oxide to generate hydrogen from steam have been proposed in the prior art. Among the metal-metal oxide systems suggested for this purpose are $Fe_3O_4$-Fe, FeO-Fe, CoO-Co, NiO-Ni, CrO-Cr, ZnO-Zn, MnO-Mn and SnO-Sn. The use of two different oxides of the same metal, $Fe_3O_4$-FeO, $MnO_3$-MnO and $Cr_2O_3$-CrO for example, has also been suggested. It has been proposed that these metals or metal oxides be used at temperatures in the range of from 1,200° F. to 2,000° F. and that they be impregnated on a silica or alumina base and employed in fluidized bed operations. Although processes of this type have shown more promise, it has been found that the steam conversion obtained is limited because of the high temperatures required, that the yields of hydrogen obtained from synthesis gas produced from coal char and similar materials is generally low, and that the process economics are poor.

SUMMARY OF THE INVENTION

This invention provides an improved process for the generation of hydrogen which largely avoids the difficulties referred to above and permits production of essentially pure hydrogen from coal char synthesis gas and similar materials at relatively low cost. The improved process involves the reaction of carbon monoxide or a similar reducing gas with stannic oxide at a temperature from about 800° to 1,200° F. until from about 30 to about 50 weight percent of the stannic oxide has been converted to metallic tin, the contacting of the resultant mixture of stannic oxide and metallic tin with steam at elevated pressure and at a temperature from about 800° F. to about 1,200° F., and the recovery of high pressure, substantially pure hydrogen which requires little further treatment prior to use of the gas in hydrogenation operations or other process application. Studies have shown that this use of a $SnO_2$-Sn system for generating hydrogen has numerous advantages over processes based on use of the water-gas shift reaction or the use of iron oxides and other metal-metal oxide systems proposed heretofore.

The process of the invention is normally carried out in parallel, fixed bed reaction vessels by contacting finely divided stannic oxide in one vessel with synthesis gas or a similar reducing gas having a relatively high concentration of carbon monoxide and containing a relatively small amount of carbon dioxide. Equilibrium limitations generally mitigate against the use of flue gases with high carbon dioxide contents unless at least part of the carbon dioxide is first separated from the gas. This initial contacting step is carried out at a pressure in the range between atmospheric and the desired hydrogen delivery pressure, preferably at substantially atmospheric pressure, and at a temperature within the range between about 800° F. and 1,200° F., preferably between about 800° F. and 1,000° F. At temperatures above about 1,200° F., the metallic tin formed on reduction of the stannic oxide tends to separate from the unreacted oxide and coalesce into droplets which are relatively inert to steam in the subsequent hydrogen generation step of the process. The reduction of stannic oxide to metallic tin is continued until from about 30% to about 50% by weight of the stannic oxide has been converted, at which time the introduction of reducing gas into the reaction vessel is terminated. If the reduction step is carried too far, separation of the metallic tin and coalescence of the metal into small droplets again tends to make the metal unreactive to steam during the hydrogenation step of the process. The gases taken off overhead from the first reaction vessel will normally consist primarily of a mixture of carbon dioxide, steam, and unreacted hydrogen and carbon monoxide. The steam and carbon dioxide are separated from the gas stream and the hydrogen and carbon monoxide are recycled for use in the stannic oxide reduction step.

While stannic oxide is being reduced to metallic tin as described above in one reaction vessel, hydrogen is generated in a second reaction vessel by passing steam through a previously reduced bed of stannic oxide and metallic tin. The steam employed is introduced into the reaction zone at elevated pressure, preferably at a pressure equivalent to the hydrogen delivery pressure, and at a temperature in the range between about 800° F. and 1,200° F., preferably in the range from about 800° F. to about 1,000° F. These relatively low temperatures favor the equilibrium limited conversion of steam to hydrogen and make possible much higher conversions than can otherwise be obtained. The high pressure gas taken overhead from the second vessel consists of steam and substantially pure hydrogen which, after cooling and condensing of the steam, can be employed for hydrogenation and other purposes without extensive further processing or compression. This elimination of the downstream processing normally required for hydrogen produced by the water-gas shift reaction represents a substantial advantage for the process of the invention over processes employed in the past.

DESCRIPTION OF THE PREFERRED EMBODIMENTS

Figure 1:
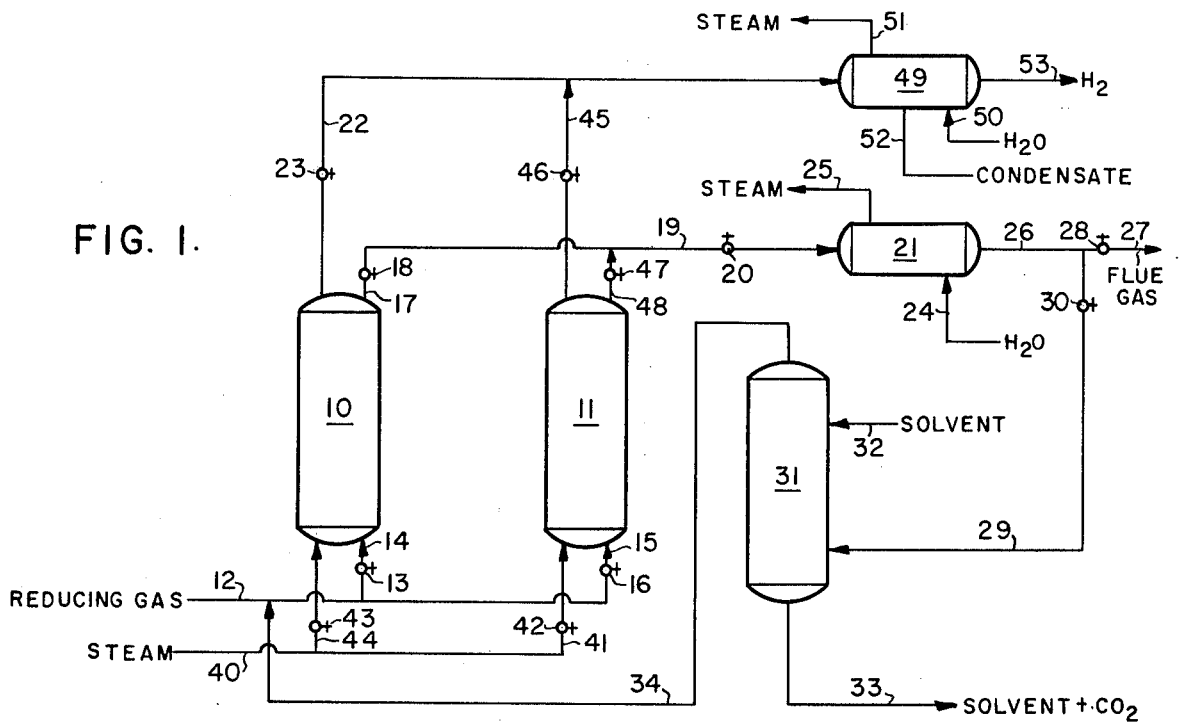
FIG. 1 in the drawing is a schematic flow sheet of a process for the generation of hydrogen by the reduction of stannic oxide to metallic tin and subsequent treatment of the tin with steam in accordance with the invention.

In the process illustrated in FIG. 1 of the drawing, two or more parallel fixed bed reaction vessels designated by reference numerals 10 and 11 are used for the cyclic treatment of stannic oxide with a reducing gas to produce metallic tin and the subsequent reaction of steam with this tin to generate hydrogen. The reducing gas, introduced into this system through line 12 from a coal gasification plant or similar source, will normally be a synthesis gas containing less than about 25 volume percent carbon dioxide produced by contacting steam with hot coal char or similar material. Typical compositions for such gases are as follows:

TABLE I

| Constituent | Typical Reducing Gas Compositions, Mol % | | |
| --- | --- | --- | --- |
| | Synthesis Gas A | Synthesis Gas B | Synthesis Gas C |
| CO | 27.1 | 17.5 | 35.1 |
| $H_2$ | 27.1 | 32.5 | 59.6 |
| $CO_2$ | 16.5 | 11.5 | 3.2 |
| $CH_4$ | 3.6 | 5.1 | — |
| $H_2O$ | 25.5 | 33.2 | 2.1 |
| Others | 0.5 | 0.2 | — |
| | 100.0 | 100.0 | 100.0 |

Although the use of a synthesis gas is normally preferred, other gas streams containing relatively high concentrations of carbon monoxide or a similar reducing gas may also be used. Such gas streams include producer gas manufactured by contacting hot coke with air, flue gases which have been treated to reduce the carbon dioxide content to acceptable limits, gases from carbon monoxide generators, and the like. The gas employed will normally be introduced into the system at substantially atmospheric pressure and at a temperature between about 800° and about 1,200° F., preferably between about 800° and about 1,000° F. In some cases, it may be feasible to pass the gas stream to the hydrogen generation plant from a synthesis gas generator or similar unit without an intermediate heat transfer step; while in other instances furnaces, heat exchangers or other equipment may be needed to provide the gas temperatures required. The system to be employed will depend upon the particular source from which the reducing gas is obtained.

During the initial phase of the process of the invention, the hot reducing gas introduced into the system by means of line 12 is passed through line 13 containing valve 14 into reaction vessel 10. Valve 15 in line 16 is closed. The hot gas is contacted in vessel 10 at substantially atmospheric pressure with a fixed bed of stannic oxide particles supported on one or more suitable grids, screens or similar devices within the reaction vessel. The particles employed may consist essentially of metallic tin which has been partially converted to stannic oxide as described hereafter or may instead be composed of tin and stannic oxide on an inert or catalytically active support such as Kieselguhr, faujasite, silica gel or a similar porous, high surface area solid. Studies indicate that such materials may in some cases provide nucleation sites to seed the formation of small stannic oxide crystallites, thus enhancing the oxidation and reduction reactions which take place in the process of the invention and reducing the inventory of tin and stannic oxide required to carry out the process. The reducing constituents in the gas stream contacted with the particles in vessel 10, normally consisting primarily of carbon monoxide and hydrogen, react with the stannic oxide on the particle surfaces to form metallic tin in accordance with the reactions:

$$2CO + SnO_2 \rightarrow Sn + 2CO_2$$

$$2H_2 + SnO_2 \rightarrow Sn + 2H_2O$$

The gas leaving the bed will normally contain unreacted carbon monoxide and hydrogen, carbon dioxide, water vapor, and constituents of the input gas stream which do not enter into the reaction with the stannic oxide. This gas stream is taken overhead from vessel 10 through line 17 containing valve 18 and passed by means of line 19 containing valve 20 to waste heat boiler 21. Valve 23 in line 22 is kept closed. Water introduced into the waste heat boiler through line 24 passes in indirect heat exchange with the hot gas and is converted to steam which is withdrawn through line 25. The gas withdrawn from vessel 21 will normally be at substantially atmospheric pressure and have a temperature in the range of from about 100° to about 200° F. The exact temperature and pressure of the discharged gas will depend in part on the temperature and pressure at which the gas is sent to the waste heat boiler, which in turn is governed by the operating conditions in reaction vessel 10. Economic considerations normally make it advantageous to carry out the $SnO_2$-reduction reaction in vessel 10 at substantially atmospheric pressure and temperatures near the low end of the 800° to 1,200° F. range, but elevated pressures and somewhat higher reaction temperatures may in some cases be employed if desired.

The cooled gas stream is withdrawn from waste heat boiler 21 through line 26 and, depending upon the composition of the gases, may be vented to the atmosphere through line 27 containing valve 28 or recycled, at least in part, through line 29 containing valve 30. As indicated earlier, the gas stream obtained from the $SnO_2$-reduction step will normally contain substantial amounts of carbon dioxide and unreacted carbon monoxide and hydrogen. If this gas contains relatively small amounts of nitrogen and other constituents, as will generally be the case where the process of the invention is carried out with a synthesis gas derived from coal or a similar carbonaceous material, it will generally be advantageous to treat the gas stream for the removal of excess carbon dioxide and recycle the treated gas for the reduction of additional stannic oxide. The conversion of carbon monoxide to carbon dioxide in this reaction is equilibrium limited and hence the carbon dioxide content of the recycled gas should be relatively low, generally less than about 40 percent by volume and preferably less than about 20 percent by volume. These levels are considerably higher than those which can be tolerated in conventional processes and thus extensive treatment of the recycle gas is generally unnecessary. The carbon dioxide content of the gas to be recycled can be reduced as shown in FIG. 1 by passing the gas stream through line 29 to scrubber 31, where it is contacted with a conventional carbon dioxide absorbing solvent introduced through line 32. Suitable solvents which may be employed include n-methyl pyrrolidone, triethanolamine, propylene carbonate, and hot potassium carbonate. The spent solvent containing absorbed carbon dioxide is recovered from the scrubber by means of line 33 and may be treated for the recovery of carbon dioxide and then recycled. Most of the carbon dioxide can generally be removed from the solvent by flashing and the rest is usually recovered by stripping with an inert gas. The recovered carbon dioxide is normally of relatively high purity and can be employed for organic synthesis and other purposes. The gas stream taken overhead from scrubber 31, which will generally have a carbon dioxide content less than about 5 percent by volume, is recycled through line 34 and may be added to the reducing gas stream introduced into the system through line 12 upstream from reaction vessel 10. Depending upon the volume of gas recycled, it may be advantageous to pass the recycle gas through a furnace or heat exchanger not shown in the drawing before mixing it with the input stream of reducing gas in line 12.

The reduction of stannic oxide to metallic tin in vessel 10 is carried out as described above until from about 30 to about 50 percent, preferably from about 30 to about 40 percent, by weight of the stannic oxide has been converted. Experimental work has shown that conversion levels in excess of about 50 percent tend to cause shrinkage and cracking of the bed of stannic oxide-metallic tin particles and that small droplets of coalesced tin tend to form as the liquid metal separates from the remaining unreduced oxide. The separated metal shows little reactivity to steam during the subsequent hydrogen generation step of the process. In addition, the stannic oxide reduction rate normally varies as an inverse function of the degree of conversion of the oxide to metallic tin and becomes essentially zero when from about 60 to about 70 percent of the oxide has been reduced.

While stannic oxide is being reduced to metallic tin in reaction vessel 10 as described above, metallic tin is being oxidized with steam in reaction vessel 11 to form stannic oxide and liberate hydrogen. The steam employed, normally at a temperature within the range of from about 800° F. to about 1,200° F. and at a pressure within the range of from about 100 to about 2,500 pounds per square inch, is introduced into the system through line 40 from a steam generator or other suitable source. It is generally preferred that the steam temperature be substantially the same as the stannic oxide reduction temperature in vessel 10 and that the steam be introduced at a pressure corresponding to the desired hydrogen delivery pressure. Temperatures in the range of from about 800° to about 1,000° F. and pressures of from about 1,000 to about 2,000 pounds per square inch gauge are generally preferred. This use of relatively low temperatures and high pressures permits higher hydrogen yields than can normally be obtained otherwise, reduces the thermal load on the system, and eliminates the need for hydrogen compression facilities which account for a large part of the total capital investment required in conventional hydrogen generation plants.

Steam from line 40 is passed by means of line 41 containing valve 42 into reaction vessel 11. Valve 43 in line 44 is closed. Vessel 11 contains a bed of particles containing metallic tin produced by the reduction of stannic oxide with a reducing gas as described earlier. As pointed out above, the stannic oxide is only partially reduced during the oxide reduction step and hence the particles will normally contain up to about 70 percent by weight of stannic oxide. The metallic tin and stannic oxide may be supported upon particles of Kieselguhr, faujasite, silica gel or a similar porous solid having a high surface area. These particles will normally be supported upon one or more grids or screens disposed within the reaction vessel. The metallic tin contacted by the high pressure steam introduced into the vessel reacts with the steam to produce high pressure hydrogen gas in accordance with the reaction:

$$Sn + 2H_2O \rightarrow SnO_2 + 2H_2.$$

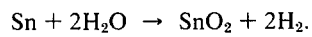

This hydrogen gas and unreacted steam are taken off overhead from vessel 11 through line 45 containing valve 46. Valve 47 in line 48 is closed. The mixture of steam and hydrogen is passed to condenser 49 where the temperature of the gas stream is reduced by indirect heat exchange with water introduced through line 50. Steam containing the recovered heat is withdrawn through line 51 and may be employed for the production of reducing gas or used in other process applications. Condensate from the gas stream is withdrawn by means of line 52. The product gas, consisting essentially of high pressure hydrogen, is withdrawn from the system through line 53 and may be sent to storage or passed directly to a hydrogenation unit or the like. As indicated earlier this recovery of high purity hydrogen at the desired delivery pressure eliminates the high compression costs associated with most other hydrogen generation processes and thus permits substantial savings.

Studies indicate that the reaction of metallic tin with steam is governed by first order kinetics and that the reaction rate decreases with time. It may therefore be preferred to terminate the tin oxidation step after from about 50 to about 85 percent of the metallic tin present in the reaction vessel has been converted to stannic oxide. Although the drawing shows only two reaction vessels, it will be understood that the process of the invention may be carried out with more than two vessels and that the reduction and oxidation steps may be arranged to accommodate differences in the time required for the two steps. In some instances, for example, it may be preferred to employ three reaction vessels and arrange the sequence of operations so that stannic oxide is being reduced to metallic tin in two of the vessels while tin is being oxidized to stannic oxide in a third vessel. Various arrangements which will permit cyclic operation without unnecessary downtime will be apparent to those skilled in the art.

After the desired degree of conversion of stannic oxide to metallic tin in vessel 10 and the desired conversion of tin to stannic oxide in vessel 11 have been achieved, the two reaction vessels may be cycled. This is accomplished by closing valves 20, 42 and 46 to isolate vessel 11 from the steam injection system and opening valve 18 so that the high pressure gases in vessel 11 can backflow through line 19, vessel 10, and lines 13 and 12 to a reducing gas surge tank, not shown in the drawing, until vessels 10 and 11 are at essentially the same pressure. During this period, valves 13 and 47 will remain open and valves 43 and 22 will remain closed. After the pressure has been equalized, valves 13 and 18 are closed to isolate vessel 10 from the reducing gas system. Valves 43 and 22 are then opened to permit the flow of steam from line 40 through vessel 10 to condenser 49. Similarly, valves 16, 47 and 20 are opened to permit the passage of reducing gas from line 12 through vessel 11 to waste heat boiler 21. Once this changeover has been made, operations are resumed in much the same manner as described earlier. Reducing gas introduced into vessel 11 converts stannic oxide to metallic tin and results in the production of a gas stream containing carbon dioxide which may be treated and recycled as shown. Similarly, the introduction of steam into vessel 10 results in the oxidation of metallic tin to stannic oxide and the production of a gas stream from which essentially pure hydrogen is recovered following removal of steam as condensate. As indicated earlier, three or more reaction vessels may be employed in lieu of the two shown in order to minimize downtime during the operation and increase process efficiency.

The nature and objects of the invention can be further illustrated by referring to the results of experimental work and theoretical studies of the process. In a first series of experimental tests, a fixed bed reactor containing finely divided stannic oxide particles was prepared. Tests were carried out with stannic oxide from two different sources. One of the materials was a commercial technical grade stannic oxide marketed by Baker Chemical Company. The other was prepared by the precipitation of stannous oxide from stannous chloride solution by neutralization with 10 percent excess sodium carbonate, followed by steam oxidation to stannic oxide. In both cases the stannic oxide was a white powder having a bulk density of about 1.61 grams per cubic centimeter. The reactor was equipped with lines to permit the flow of either carbon monoxide or steam upwardly through the reactor bed, with a heater to permit control of the bed temperature, and with a condenser and meter to permit the removal of water vapor from the gaseous effluent and measurement of the volume of gases produced.

Runs for the reduction of stannic oxide to metallic tin were carried out by contacting the oxide in the fixed bed reactor with carbon monoxide gas at a gas velocity of about 0.03 foot per second and at various temperatures between about 900° and about 1,600° F. It was found that the bed in the reactor began to shrink and crack when more than about 50 weight percent of the stannic oxide was converted to metallic tin. Small droplets of coalesced tin formed as the liquid metal separated from the remaining and reduced oxides. Tests showed that the metal separated much more readily at temperatures of 1,400° to 1,600° F. than at lower temperatures. Subsequent efforts to generate hydrogen by contacting the metal with steam showed that the tin liberated at temperatures in the 1,400° to 1,600° F. range had very little reactivity to the steam. The tests also showed that the synthetically prepared stannic oxide had more surface area and higher activity than the commercial material. The prepared oxide had a surface area of 65 square meters per gram, which diminished to 20 square meters per gram when approximately 50 percent of the oxide was reduced to metal. The commercial oxide has a surface area of 4.5 to about 5.3 square meters per gram and this did not change appreciably with reduction of the oxide. The greater activity of the synthetic oxide may have been due in part to the presence of small amounts of sodium carbonate deposited during the preparation process. Alkali metal carbonates tend to catalyze the reduction of certain oxides and can therefore be employed to improve the reduction process.

Figure 2:
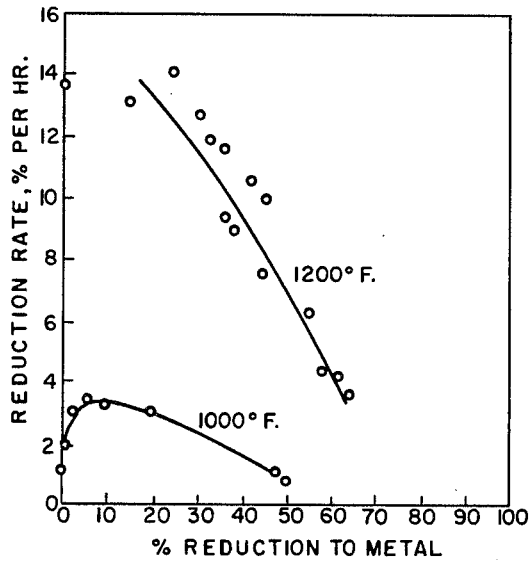
FIG. 2 is a plot of experimental data showing the rate at which stannic oxide is converted to metallic tin as a function of the degree of conversion at various temperatures.

FIG. 2 in the drawing is a plot of experimental data from the runs referred to above which shows the rate at which stannic oxide is reduced to metallic tin as a function of the degree of conversion at various temperatures. It will be noted that the reaction rate slows as the oxide is reduced and falls off almost linearly from relatively high values to much lower values, extrapolating to zero at about 70 percent conversion of the oxide to metal. This rate effect, plus the coalescence of metallic tin at conversion levels greater than about 50 percent, generally makes it advantageous to carry out the reduction step until from about 30 to about 50 percent by weight of the stannic oxide has been converted to metallic tin.

Figure 3:
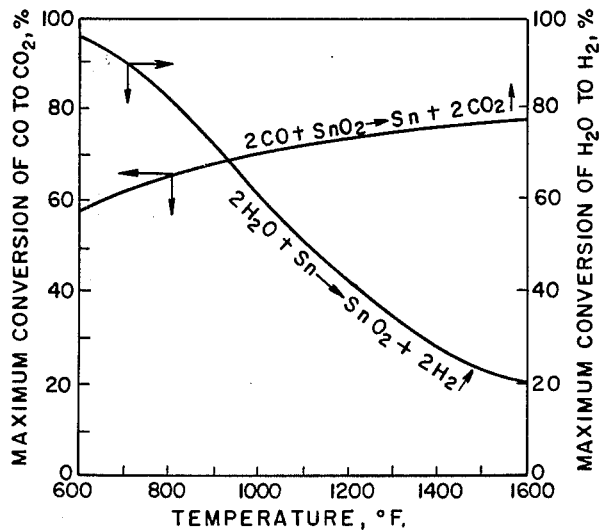
FIG. 3 is a plot showing the maximum theoretical conversion of carbon monoxide to carbon dioxide by the reduction of stannic oxide to metallic tin and the maximum theoretical conversion of steam to hydrogen by contact with tin at various temperatures.

FIG. 3 of the drawing is a plot prepared from thermodynamic data which shows the maximum theoretical conversion of carbon monoxide to carbon dioxide by the reduction of stannic oxide to metallic tin and the maximum theoretical conversion of steam to hydrogen by contacting the steam with metallic tin at various temperatures. The data shown were obtained by calculating the free energy changes taking place in the reactions and then using these to calculate the equilibrium constants and maximum possible conversions at various temperatures. It will be noted that the maximum conversion of carbon monoxide to carbon dioxide increases from about 58 percent at 600° F. to about 76 percent at 1,600° F. and that the maximum theoretical conversion of steam to hydrogen decreases from about 96 percent at about 600° F. to about 20 percent at 1,600° F. In order to maintain the process efficiency at acceptable levels and obtain reasonably high hydrogen yields from the process, it will be apparent from FIG. 3 that it is advantageous to operate both the oxidation and reduction steps of the process at temperatures within the range between about 800° and about 1,000° F. At temperatures greater than about 1,200° F., the yield of hydrogen falls off to levels which tend to make the process prohibitively expensive. By maintaining the temperatures in the oxidation and reduction steps essentially the same, the thermal loading on the process can be kept low and operating costs can be minimized.

Figure 4:
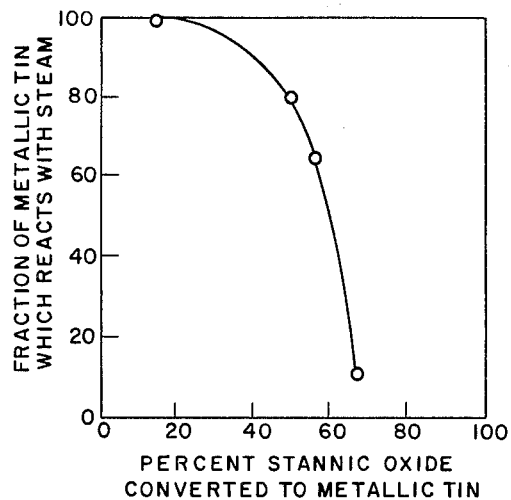
FIG. 4 is a plot of experimental data showing a fraction of the metallic tin which will react with steam to produce hydrogen as a function of the amount of stannic oxide converted to tin at a temperature of 1,200° F.

At the end of each of the runs for the generation of metallic tin by reducing stannic oxide with carbon monoxide as described above, hydrogen was generated by contacting the mixture of tin and stannic oxide in the fixed bed with steam at various temperatures. As indicated by the equilibrium data in FIG. 3 of the drawing, these tests showed that hydrogen production was greatest at relatively low temperatures. It was also found that the metallic tin liberated at stannic oxide conversion levels above about 50 to 60 weight percent tended to be unreactive with the steam and that the tin produced at temperatures in the 1,400° F. to 1,600° F. range showed little reactivity. FIG. 4 in the drawing is a plot illustrating the fraction of metallic tin which reacts with the steam as a function of the depth of conversion to the metal at 1,200° F. It can be seen from FIG. 4 that essentially all of the metal liberated at low conversion levels will react with the steam to form hydrogen but that the amount of metal reacting falls off rapidly at conversion levels above about 50 weight percent. Reduction of the stannic oxide to tin at higher temperatures shifts the curve of FIG. 4 to the left so that the fraction of the tin available for reaction with the steam becomes lower. At 1,400° to 1,600° F., very little of the metal, even that formed at low conversion, reacts with the steam. The unreactive metal is not permanently lost but generally has to be reoxidized to stannic oxide in air or oxygen in order to restore its activity.

Figure 5:
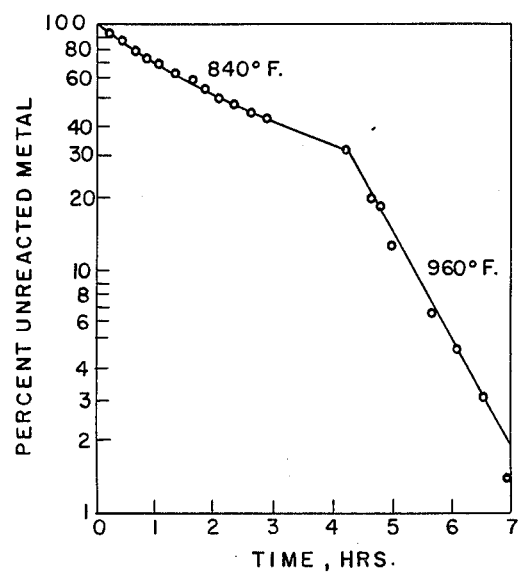
FIG. 5 is a plot of experimental data showing the reaction of steam with metallic tin to produce hydrogen as a function of time.

FIG. 5 in the drawing is a plot illustrating the reaction of metallic tin with steam to produce hydrogen as a function of time. The run illustrated was started at a temperature of 840° F. and continued for four hours, at the end of which the temperature was raised to 960° F. Steam was passed through the fixed bed containing the metallic tin and stannic oxide at a constant rate during the run. The superficial steam residence time at reactor conditions was 4.1 seconds. The data show that increasing the temperature increases the rate at which hydrogen is generated with the metallic tin available at the reaction temperature and that the metal which reacts appears to do so in accordance with first order reaction kinetics. Increasing the steam residence time increases the amount of steam conversion but the increase is not directly proportional to the increased residence time.

Following the runs referred to above, cyclic runs were carried out using the same equipment. In the first such run, a 100 gram batch of commercial stannic oxide was treated with carbon monoxide for 2 hours at 1,200° F. Approximately 26 percent by weight of the stannic oxide was reduced to metallic tin. Following this, 6 oxidation/reduction cycles composed of steam treatment for ½ hour at 900° F. followed by carbon monoxide reductions for 1 hour at 1,200° F. were carried out. A second set of runs consisting of 12 cycles using an initial carbon monoxide treatment of 1 hour was then made. The hydrogen yield on each cycle was measured and is set forth in Table II below.

TABLE II

Hydrogen Yields in Cyclic Operation
Cycle: 30 Minutes Steam at 900° F./
60 Minutes CO at 1200° F.

| Run No. | Cycle No. | $H_2$ Yield cc at STP | Mol % Sn in (Sn + $SnO_2$) Reacting |
|---|---|---|---|
| 1 | 1 | 2500 | 16.8 |
|   | 2 | 1920 | 12.9 |
|   | 3 | 1050 | 7.0 |
|   | 4 | 950 | 6.4 |
|   | 5 | 1400 | 9.4 |
| 2 | 1 | 2180 | 14.7 |
|   | 2 | 2200 | 14.8 |
|   | 3 | 2130 | 14.3 |
|   | 4 | 1840 | 12.4 |

TABLE II-Continued

Hydrogen Yields in Cyclic Operation
Cycle: 30 Minutes Steam at 900° F./
60 Minutes CO at 1200° F.

| Run No. | Cycle No. | $H_2$ Yield cc at STP | Mol % Sn in (Sn + $SnO_2$) Reacting |
|---|---|---|---|
|   | 5 | 1600 | 10.8 |
|   | 6 | 1470 | 9.9 |
|   | 7 | 1310 | 8.8 |
|   | 8 | 1500 | 10.1 |
|   | 9 | 1210 | 8.1 |
|   | 10 | 1500 | 10.1 |
|   | 11 | 1370 | 9.2 |
|   | 12 | 1370 | 9.2 |

It can be seen from the above data that the activity of the tin and stannic oxide mixture declined somewhat during the initial operation and then appeared to level off at about 60 percent of the original value. The hydrogen gas recovered consisted of essentially pure hydrogen at temperature and pressure conditions corresponding to those in the reactor during the tin oxidation step of the process.

I claim:
1. A process for the production of hydrogen which comprises:
   a. contacting particles containing a mixture of stannic oxide and metallic tin with a reducing gas at a temperature in the range between about 800° F. and about 1,200° F. until from about 30 to about 50 weight percent of said stannic oxide has been converted to metallic tin;
   b. discontinuing the contacting of said particles with said reducing gas;
   c. contacting the said particles with steam at elevated pressure and at a temperature in the range between about 800° F. and about 1,200° F.; and
   d. recovering substantially pure hydrogen.
2. A process as defined by claim 1 wherein said reducing gas is a synthesis gas produced from a carbonaceous solid.
3. A process as defined by claim 1 wherein said particles containing said stannic oxide and metallic tin are contacted with said reducing gas at substantially atmospheric pressure.
4. A process as defined by claim 1 wherein said particles are contacted with said steam at a pressure in the range between about 100 and about 2,500 pounds per square inch.
5. A process as defined by claim 1 wherein said particles are contacted with said reducing gas and with said steam at substantially the same temperature.
6. A process as defined by claim 5 wherein said temperature is in the range between about 800° F. and about 1,000° F.
7. A process as defined by claim 1 wherein said particles are contacted with said reducing gas and with said steam in fixed beds.
8. A process as defined by claim 1 including the additional step of recovering from said contacting of said particles with said reducing gas a gas stream containing carbon dioxide and unreacted reducing gas, treating said gas stream for the removal of carbon dioxide, and recycling the treated gas for the contacting of said particles.
9. A process as defined by claim 1 wherein said particles in step (a) comprise a porous, high surface area solid support.

10. A process as defined by claim 1 wherein said reducing gas comprises carbon monoxide.

11. A process for the manufacture of high pressure hydrogen which comprises:
 a. introducing a reducing gas comprising carbon monoxide and less than about 25 volume percent carbon dioxide into a reaction zone containing a fixed bed of stannic oxide and metallic tin, said reducing gas being introduced at a temperature in the range between about 800° F. and about 1,200° F.;
 b. withdrawing a gas stream of increased carbon dioxide content overhead from said reaction zone;
 c. discontinuing the introduction of said reducing gas into said reaction zone after from about 30 to about 50 weight percent of said stannic oxide has been converted to metallic tin;
 d. thereafter introducing steam into said reaction zone at a temperature in the range between about 800° F. and about 1,200° F. and at elevated pressure and withdrawing a gas stream containing steam and high pressure hydrogen overhead from said reaction zone; and
 e. removing steam from said gas stream and recovering high pressure hydrogen.

12. A process as defined by claim 11 wherein said introduction of steam into said reaction zone is discontinued after from about 50 to about 85 weight percent of said metallic tin has reacted with steam to produce hydrogen.

13. A process as defined by claim 11 wherein said reducing gas is a synthesis gas produced by the treatment of coal with steam.

14. A process as defined by claim 11 wherein said reducing gas is a producer gas generated by the treatment of carbonaceous solids with air.

15. A process as defined by claim 11 wherein said reducing gas consists essentially of carbon monoxide.

16. A process as defined by claim 11 wherein said reducing gas is introduced into said reaction zone at substantially atmospheric pressure.

17. A process as defined by claim 11 wherein said steam is introduced into said reaction zone at a pressure in the range between about 100 and about 2,500 pounds per square inch.

18. A process as defined by claim 11 wherein said gas stream of increased carbon dioxide content is treated for the removal of at least part of the carbon dioxide and recycled to said reaction zone.

19. A process as defined by claim 11 wherein said reducing gas and said steam are introduced into said reaction zone at substantially the same temperature.

* * * * *